US 7,984,431 B2

(12) United States Patent
Kejariwal et al.

(10) Patent No.: US 7,984,431 B2
(45) Date of Patent: Jul. 19, 2011

(54) METHOD AND APPARATUS FOR EXPLOITING THREAD-LEVEL PARALLELISM

(75) Inventors: Arun Kejariwal, Irvine, CA (US); Xinmin Tian, Union City, CA (US); Wei Li, Redwood Shores, CA (US); Milind B. Girkar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1142 days.

(21) Appl. No.: 11/695,012

(22) Filed: Mar. 31, 2007

(65) Prior Publication Data
US 2008/0244549 A1    Oct. 2, 2008

(51) Int. Cl.
G06F 9/45    (2006.01)
(52) U.S. Cl. ........ 717/151; 717/124; 717/131; 717/132; 717/155
(58) Field of Classification Search ............ 717/151
See application file for complete search history.

(56) References Cited

U.S. PATENT DOCUMENTS

2006/0288335 A1* 12/2006 Goglin et al. ............... 717/130
2007/0214342 A1*  9/2007 Newburn et al. ............ 712/216
2007/0226718 A1*  9/2007 Watanabe ................... 717/151

OTHER PUBLICATIONS

Akhter, Shameem and Roberts, Jason, "Multi-Core Programming—Chapter 1: Introduction to Multi-Core Architecture" Apr. 2006, pp. 1-19.*
"OpenMP Application Program Interface", *Version 2.5*, Copyright © 1997-2005, OpenMP Application Review Board,(May 2005), 250 pgs.

Allen, R. , et al., "Table of Contents", *Optimizing Compilers for Modern Architectures—A Dependence-Based Approach*, Morgan Kaufmann Publishers, (2002), 11 pgs.
Banerjee, U., "Table of Contents"*In: Dependence Analysis for Supercomputing*, Kluwer Academic Publishers,(1998), 3 pgs.
Haghighat, M. R., et al., "Symbolic Program Analysis and Optimization for Parallelizing Compilers", *Proceedings, 5th International Workshop of Languages and Compilers for Parallel Computing (LCPC 1992)*, (Aug. 3-5, 1992, New Haven, CT),(1992), 30 pgs.
Han, H. , et al., "Eliminating Barrier Synchronization for Compiler-Parallelized Codes on Software DSMs", *International Journal of Parallel Programming*, 26(5), (1998), 591-621.
Karp, R. M., et al., "The Organization of Computations for Uniform Recurrence Equations", *Journal of the Association for Computing Machinery*, 14(3), (1967), 563-590.
Kogge, P. M., et al., "A Parallel Algorithm for the Efficient Solution of a General Class of Recurrence Equations", *IEEE Transactions on Computers*, vol. C-22, No. 8, (1973), 786-793.
Lavery, D. M., et al., "Unrolling-Based Optimizations for Modulo Scheduling", *Proceedings of the 28th Annual International Symposium on Microarchitecture*, (1995), 327-337.

(Continued)

*Primary Examiner* — Thomas K Pham
(74) *Attorney, Agent, or Firm* — Schwegman, Lundberg & Woessner, P.A.

(57) ABSTRACT

According to one example embodiment, there is disclosed herein uses partial recurrence relaxation for parallelizing DOACROSS loops on multi-core computer architectures. By one example definition, a DOACROSS may be a loop that allows successive iterations executing by overlapping; that is, all iterations must impose a partial execution order. According to one embodiment, the inventive subject matter may be used to transform the dependence structure of a given loop with recurrences for maximal degree of thread-level parallelism (TLP), where the threads can be mapped on to either different logical processors (in a hyperthreaded processor) or can be mapped onto different physical cores (or processors) in a multi-core processor.

15 Claims, 3 Drawing Sheets

OTHER PUBLICATIONS

Lundstrom, S. F., et al., "A Controllable MIMD Architecture", *Proceedings of International Conference of Parallel Processing (ICPP '80)*, (Aug. 1980), 19-27.

Midkiff, S. P., et al., "Compiler Algorithms for Synchronization", *IEEE Transactions on Computers*, vol. C-36, No. 12, (1987), 1485-1495.

Ousterhout, J.K., "Scheduling Techniques for Concurrent Systems", *Proceedings, The 3rd International Conference on Distributed Systems*, (Oct. 18-22, 1982, Miami/Ft. Lauderdale, FL),(1982), 22-30.

Rau, B. R., et al., "Some Scheduling Techniques and an Easily Schedulable Horizontal Architecture for High Performance Scientific Computing". *Proceedings, 14th Annual Microprogramming Workshop*, (Oct. 12-15, 1981, Chatham, MA),(1981), 183-198.

Shay, S., et al., "Flexible Control Structures for Parallelism in OpenMP", *Concurrency: Practice and Experience*, 12, (2000), 1219-1239.

Tang, P., et al., "Reducing Data Communication Overhead for Coacross Loop Nests", *Proceedings of the 8th International Conference on Supercomputing(ICS '94)*, (1994), 44-53.

\* cited by examiner

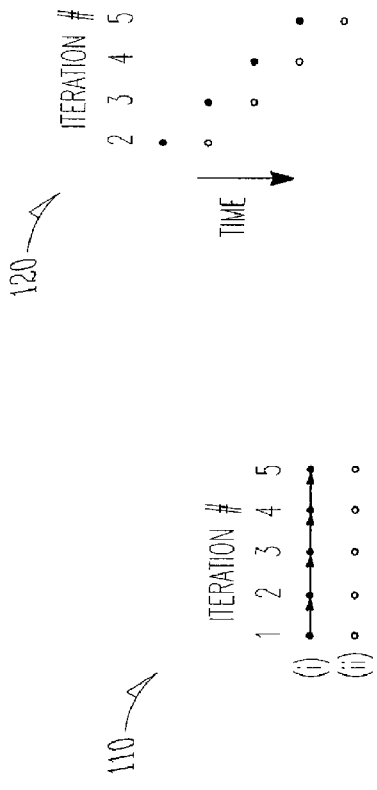
FIG. 1A
FIG. 1B
FIG. 1C
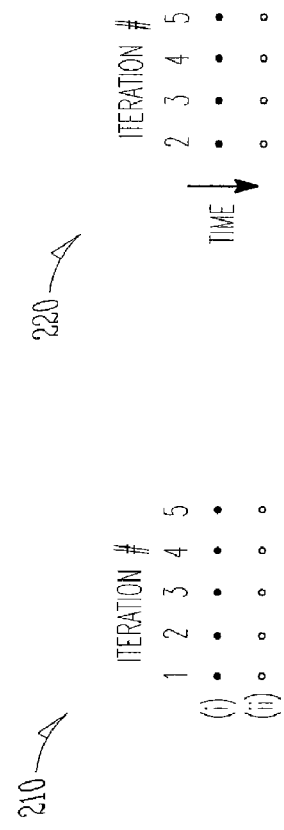
FIG. 2A
FIG. 2B
FIG. 2C

FIG. 3A 454.calculix: mostruct.c: 300
```
for(i=1;i<*neq;++i)
{
    iq[i] = ipointer[i];
    icol[i] = icol[i-1] + i - jq[i] + 1;
}
```

FIG. 3B

```
for(i=0;i<*neq;i++)
{
    iq[i] = ipointer[i];
    icol[i] = icol[i-2] + 2*i - jq[i] - jq[i-1] + 1;
}
```

METHOD AND APPARATUS FOR EXPLOITING THREAD-LEVEL PARALLELISM

TECHNICAL FIELD

Various embodiments described herein relate to computer technology generally, including method and apparatus for exploiting thread-level parallelism.

BACKGROUND

With the emergence of multi-core systems, there is increased interest in automatic parallelization. This trend can also be attributed to the fact that the increase in clock speed, the main source of achieving speedup for the last few decades, may be nearing saturation. In this scenario, the alternative is to resort to parallelization of the applications to achieve better performance. This leaves the programmer and the software tools, especially the compiler, as one of the main alternatives to achieve speedup, by extracting parallelism from the applications to execute on multi-core processor systems.

BRIEF DESCRIPTION OF THE DRAWINGS

FIGS. 1a, 1b and 1c illustrate an example of a program loop according to various embodiments of the invention.

FIGS. 2a, 2b and 2c illustrate an example of a program loop according to various embodiments of the invention.

FIGS. 3a and 3b illustrate an example program loop according to various embodiments of the invention.

DETAILED DESCRIPTION

Figure 4:
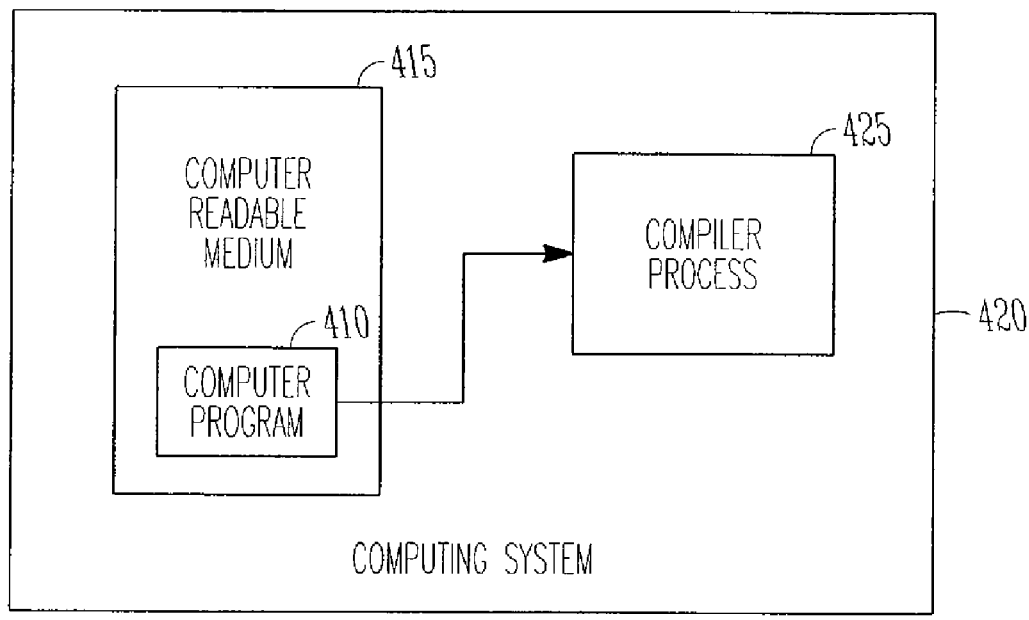
FIG. 4 is a block diagram of an article according to various embodiments of the invention.

According to one example embodiment, the inventive subject matter disclosed herein uses partial recurrence relaxation for parallelizing DOACROSS loops on multi-core computer architectures, such as but not limited to the Intel® Core™ 2 Duo processor and the Intel® Kentsfield Quad-core processor. By one example definition, a DOACROSS may be a loop that allows successive iterations executing by overlapping; that is, all iterations must impose a partial execution order. According to one embodiment, the inventive subject matter may be used to transform the dependence structure of a given loop with recurrences for maximal degree of thread-level parallelism (TLP), where the threads can be mapped on to either different logical processors (in a hyperthreaded processor) or can be mapped onto different physical cores (or processors) in a multi-core processor.

One of the benefits of the inventive subject matter is to facilitate the compiler to parallelize a loop based on the dependence pattern of the loop, its memory footprint and the memory architecture of the target platform. Some potential benefits of the embodiments of the inventive subject matter include: (a) facilitating semantic-driven parallelization by exploiting the dependence structure of the given loop; (b) enabling exploitation of nested loop-level parallelism; (c) masking the complex task of dependence analysis and transformation of the application code from the programmer; and (d) the underlying loop transformation can also be used to minimize the initiation interval during software pipelining, useful for achieving high performance on certain competing architectures, such as IA-64 based systems (wherein "IA" stands for Intel® Architecture and IA-64 is a 64-bit processor architecture developed by Intel Corporation).

Also, the applicability across different architectures is one of the potential benefits of the inventive subject matter. According to one aspect of the method and apparatus described herein, it can be applied to a large set of applications such as finite-element method simulations or mesh simulations that are highly array-centric. While the descriptions herein may relate to singly nested and doubly nested loops with array-based dependences, the inventive subject matter is not so limited.

Typically, general-purpose applications have loop-carried dependences that enforce partial/total ordering of execution of the different iterations, such as the example loop 100 is shown in FIGS. 1a, 1b and 1c. The statement-cum-iteration space 110 of the loop 100 is shown in FIG. 1b; for clarity purposes, only the dependence between the statements of different iterations is shown (via the directed arrows). From FIG. 1b it may be seen that there exists a flow dependence between statement (i) of the consecutive iterations of the loop. As a consequence, the loop is a non-DOALL loop. Although the loop can be parallelized via explicit synchronization, it does not facilitate large-scale parallel computation. Likewise, for a target such as the IA-64 based architecture or other architecture having similar characteristics, the loop can be software pipelined; however, the instruction-level parallelism (ILP) that can be exploited is limited by the recurrence-based initiation interval of 1. The resulting schedule 120 for the loop is shown in FIG. 1c.

However, the loop can be transformed to enable multi-threaded execution in a profitable fashion. This is achieved by "relaxing" the dependence between the iterations. The transformed loop 200 is shown in FIG. 2a. The corresponding statement-cum-iteration space 210 is shown in FIG. 2b. From the figure, it may be seen that there does not exist any dependence between the consecutive iterations in the transformed (DOALL) loop. As a result, all the iterations, in this case, can be executed in parallel on the different threads. 1 The parallel schedule 220 of the transformed loop is shown in FIG. 2c. The transformation relaxes the dependence between iterations i and (i−1) to iterations i and 1. As a result, the computation of A[i] can be expressed in closed form in terms of A[1] and the induction variable i.

The example loop shown in FIGS. 1a, 1b and 1c and its dependence pattern are characteristic of finite-element and image processing codes. In theory, it may be possible to transform DOACROSS loops into DOALL loops by obtaining a closed form of a computation. However, the profitability of such a transformation is strongly tied to the dependence pattern and the target architecture. In other words, parallel execution of a loop obtained via reduction of the computation to its closed form does not necessarily yield better performance. Referring to FIG. 3a, it may be seen that there exists a loop-carried dependence, between successive iterations, on icol[i]. Thus the loop 300 is a DOACROSS loop. As discussed above, in order to facilitate exploitation of higher levels of thread-level parallelism, the dependence on icol[i] can be relaxed. The transformed loop 310 after relaxation is shown in FIG. 3b.

The illustrated relaxation enables parallel execution of consecutive iterations of the loop without any inter-thread synchronization. However, as evident from above, this may come at the cost of increased computation. Furthermore, it may also result in an increase in the number of memory references and an increase in code size. This can potentially adversely affect cache performance and increase the memory bus pressure. Higher order of dependence relaxation may exacerbate the above even further. This highlights the importance of determining an "optimal" relaxation factor so as to facilitate efficient exploitation of higher degree of thread-level parallelism on the emerging multi-core systems. Since the profitability of multithreaded execution of a loop obtained via dependence relaxation is strongly tied with the target architecture, it may not be possible to determine an "optimal" relaxation factor. Therefore, according to one example embodiment, a heuristic approach may be used to determine the same.

In context of multi-core systems, according to one example embodiment, one of the potential benefits of the inventive subject matter is that it enables extraction of higher degree of thread-level parallelism in context of multi-cores. As a first step, the dependence is relaxed by a factor equal to the number of physical cores. This enables parallel execution on all the cores available. However, this does not necessarily correspond to maximal exploitation of the hardware parallelism, for example, as illustrated in FIGS. 1a to 1c, reduction of the computation of A[i] to a closed form will yield the best performance. Likewise, for systems with hyperthreaded (HT) support, the dependence is relaxed by a factor equal to the number of logical cores. Then, there may be assessed the impact of further relaxation on the increase in the amount of computation and memory operations. According to one embodiment, this can be done statically by estimating the increase in integer/floating-point operations and loads/stores for a higher relaxation factor. If the increase is more than the hardware resources available, such as the number of load/store units, then the candidate relaxation factor is discarded and the dependence is relaxed using the lower relaxation factor.

Another potentially beneficial characteristic of the approach of the inventive subject matter is that it reduces inter-thread-interaction (this can be ascribed to the reduction in thread-synchronization due to dependence relaxation) that in turn minimizes halting of the execution of a given thread due to the suspension of some other thread on an event such as a cache miss. Masking a given thread from the "ill-effects" of the other threads helps to achieve better performance. The technique of the inventive subject matter may also yield better performance on uniprocessor systems. This can be ascribed to the dependence relaxation that facilitates the scheduling of operations (in the transformed loop) earlier than in the original loop.

In context of software pipelining of loops for architectures such as IA-64, one potential benefit of the inventive subject matter is that it facilitates maximal use of the issue slots of the target machine. For this, there is first determined the value of the following without rounding of: ResII (resource-constrained initiation interval) and RecII (recurrence-constrained initiation interval). In case RecII>ResII, then loop unrolling may be used to reduce the dependence distance. However, this is not applicable is in case the dependence distance is 1. In such a scenario, the loop-carried dependence may be relaxed and then the loop unrolled and jammed loop such that RecII of the resulting loop is greater or equal to ResII.

Table 1 below presents an example performance gain that might be achieved via partial recurrence expansion for the candidate loop 300 shown in FIG. 3a. The experiments illustrated in Table 1 were performed using 4-way multiprocessor with the Linux operating system (kernel 2.6.9-34.ELsmp #1 SMP).

TABLE 1

Preliminary Results (RF = relaxation factor)

|  | RF = 2 | RF = 3 | RF = 4 |
| --- | --- | --- | --- |
| Sequential | 3.37x | 3.12x | 2.53x |
| Threaded | NA | 1.36x | 1.35x |

From Table 1, $2^{nd}$ row, it may be seen that the proposed technique is also useful for improving single thread performance. Observe that the performance decreases with increase in the relaxation factor. This is due to the increased memory traffic. It also validates the need for partial relaxation as compared to unrestricted relaxation. Likewise, the affect of dependence relaxation on threaded performance may be determined. For a base RF=2, it may be seen that RF=3 achieves a performance gain of 1.36× whereas the gain achieved on further relaxation are negligible.

The techniques proposed in the inventive subject matter disclosed herein may be used to exploit parallelism with dependences from sequential applications through the compiler. This technique will extract parallelism with dependences from loops with partial recurrence relaxation, thus achieving performance speedups on multiprocessor or multi-core processor systems. According to one embodiment, there may be provided a framework in a compiler, such as but not limited to the Intel® C++ and Fortran Product compilers, to deploy the embodiments of the inventive subject matter. Essentially, potentially beneficial loops in scientific applications such as SPECFP that cannot be handled by current DOALL automatic parallelization are potential candidates for parallelization using the proposed loop transformation.

According to another example embodiment, the inventive subject matter may include facilitating thread-level loop parallelization. Referring again to FIGS. 1a-1c, it can be seen that there exists a flow dependence between consecutive iterations of the loop. This limits the profitability of multithreaded execution of the loop. In order to alleviate this, as a first step, the dependence corresponding to computation of A[i] is relaxed to obtain: A[i]=A[i−2]+4. This enables parallel execution of iteration i and (i−1) without any thread synchronization. It also may help to achieve better performance by facilitating maximal utilization of at least two cores in a multiprocessor system. Although in this particular case the computation can be reduced to a simple closed form, it is not possible in general. For example, the reduction of—A[i][j]=A[i−1][j]+A[i−1][j−1]—to its closed form results in an exponential increase in computation and increases the memory traffic. This exemplifies the need for selecting the relaxation factor in an architecture-aware fashion. As a first step, a dependence may be relaxed by a factor equal to the number of cores in the processor. This simple heuristic may enable utilization of all the hardware parallelism that otherwise would have remained untapped.

According to another example embodiment, the inventive subject matter may include facilitating software pipelining of loops: Others have proposed the use of loop unrolling to minimize the recurrence distance. This was done so as to mitigate the performance loss due to rounding off the initiation interval to an integer value. However, the above is not applicable when the dependence distance is 1. For example, let us consider the following loop:

for (i=0; i<100; i++) {
(i) A[i]=A[i−1]+B[i]
(ii) C[i]=A[i]+C[i−2]
}

The kernel of the software pipelined version of the loop shown above consists of two instructions—one instance of (i) and (ii). This may be inefficient for a 4-wide issue instruction level parallelism (ILP) processor. Unrolling-based compaction of the loop will not yield a wider kernel in the software pipelined schedule. To alleviate this, the dependence of (i) is relaxed to obtain the following: A[i]=A[i−2]+B[i].+B[i−1]. In general, the relaxation is done such that kernel of the resulting software pipeline loop is as wide as the issue width of the target processor. Subsequently, unroll the loop by a factor equal to the relaxation factor. The kernel of the software pipelined (transformed) loop consists of 4 instructions—two instances of (i) and (ii). This may facilitate maximal utilization of the issue width of a 4-wide ILP processor. For processors with wider issue width, the recurrence can be further relaxed, subject to increase in memory references. Note that the unroll factor need not be always equal to the relaxation factor as unrolling The unroll factor is determined such that RecII>ResII.

According to another example embodiment, there is provided a high-level compiler algorithm design. The main steps of the compiler technique according to the inventive subject matter are illustrated in the following algorithm, and detailed in subsequent subsections:
1. Build the data dependence graph of an iteration of the given non-DOALL loop.
2. Compute the minimum dependence distance.
3. Based on the discussion above, compute the relaxation factor for the recurrence corresponding to step 2.
4. Update the dependence graph of the loop based on the relaxation factor.
5. Insert the post-wait synchronization or barrier synchronization in the transformed loop.
6. Dynamically map the iterations of the transformed loop on to an idle thread.

In case the dependence distance of a recurrence is not known at compile-time, then the loop can be optimized dynamically using the proposed technique.

According to one example embodiment, a recurrence can be relaxed completely, and this may be a desirable option to the extent it eliminates the need for thread synchronization by converting a non-DOALL loop to a DOALL loop, subject to presence of other control/data dependences. However, it comes at the cost of increased computation and code-size that may in turn result in increased resource contention and degradation in I-cache performance. Also, in case of array intensive codes, commonly found in image processing and finite-element codes, full relaxation would result in higher number of loads/stores, thereby adversely affecting the data cache performance and exacerbating the memory bus pressure. In light of the above limiting factors, the inventive subject matter provides a loop transformation based on partial recurrence expansion.

For large shared memory multiprocessor systems, one approach may be to relax the dependence such that there are maximal number of parallel threads (equal to the number of processors) under execution. Although this is suited for multiprocessors wherein each processor has its own cache hierarchy, it can potentially affect performance adversely on some multi-cores. This stems from the fact that physical processor share resources such as the L2 cache; likewise, in hyperthreaded (HT) systems, logical processors share the functional units. Unrestricted relaxation can potentially result in increased memory bus contention, increased destructive cache interference between the different threads and increased resource contention in HT systems. Therefore, usage of all the available threads does not necessarily correspond to better performance. Driven by the above considerations, there is statically determined the relaxation. Accordingly, according to one example embodiment of the inventive subject matter, the parallelizing technique is parameterized in terms of the processor parameters and can therefore be used seamlessly across different architectures.

Thus, the present subject matter provides several potential benefits: (a) it provides a mechanism to exploit parallelism with dependences and has minimum side effects on other compiler optimizations; (b) in conjunction with advanced symbolic analysis and pointer-range analysis, it can be used to exploit multi-level parallelism, e.g, function-level, loop-level; and; (c) the underlying loop transformation model combines compiler and run-time technology to enable parallel execution of multiple threads to achieve optimal TLP on multi-core architecture.

Figure 5:
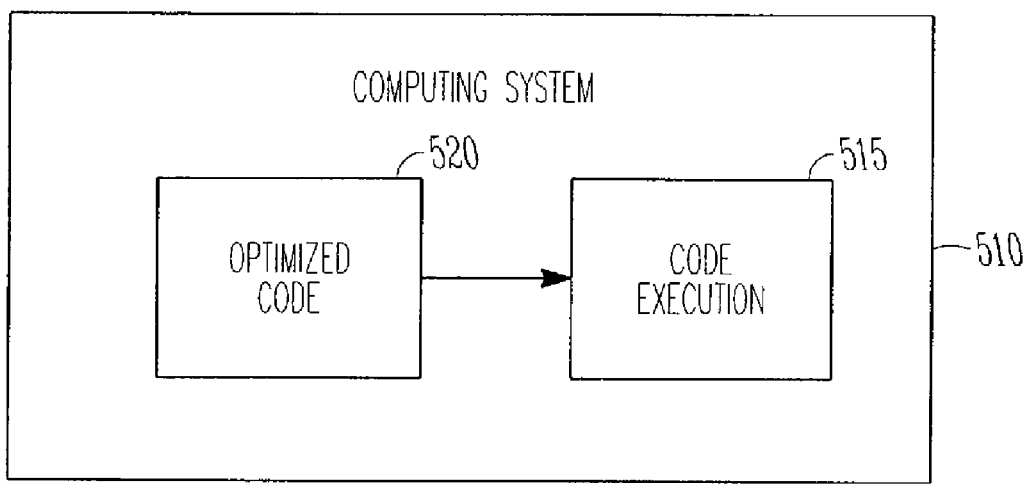
FIG. 5 is a schematic illustration of a computing system according to various embodiments of the invention.

According to one example embodiment illustrated in FIG. 4, a compiler program 410 embodying any one of the example compiling techniques described above may be launched from a computer-readable medium 415 in a computer-based system 420 to execute functions and process 425 defined in the computer program 410. The medium may contain associated information (e.g., computer program instructions, data, or both) which, when accessed, results in a machine (e.g., the processor(s)) performing the activities previously described herein. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. According to another example embodiment illustrated in FIG. 5, there is provided a computing system 510 which may execute 515 one or more loops of optimized code 520 produced by one of the compiling methods or techniques described herein, for example serially or fully or partially in parallel, for example as produced by the compiler program 410.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and that show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. For example, it may be possible to execute the activities described herein in an order other than the order described. And, various activities described with respect to the methods identified herein can be executed in repetitive, serial, or parallel fashion.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages that have been described and illustrated in order to explain the nature of the inventive subject matter disclosed herein may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A method comprising:
   modifying, using one or more processors, computer code by relaxing the dependence between iterations of at least one loop in the code, wherein relaxing the dependence between iterations of at least one loop includes removing dependencies between consecutive iterations of the at least one loop; and
   wherein the modification in the code is based on the number of physical or logical cores in the processor and the impact of further relaxation on the increase in the amount of computation or memory operations required to execute the further relaxed dependencies.

2. A method comprising:
   modifying, using one or more processors, computer code by relaxing the dependence between iterations of at least one loop in the code, wherein the modification in the code is based on the number of physical or logical cores in the processor and the impact of further relaxation on the increase in the amount of computation or memory operations required to execute the further relaxed dependencies;
   building a data dependence graph of an iteration of at least one of the loops;
   computing the minimum dependence distance to determine a recurrence;
   computing a relaxation factor for the recurrence;
   updating the dependence graph of the loop based on the relaxation factor;
   inserting a post-wait synchronization or barrier synchronization in a transformed loop; and
   dynamically mapping the iterations of the transformed loop on to an idle thread.

3. A method according to claim 2 wherein the method is carried out by a computer program stored on a machine readable medium.

4. A method according to claim 2 further wherein the dependence structure of at least one of the loops is transformed with recurrences for maximal degree of thread-level parallelism.

5. A method according to claim 4 wherein the threads are mapped on to either different logical processors or can be mapped onto different physical cores.

6. A method according to claim 2 further wherein at least one loop is parallelized.

7. A method according to claim 2 further wherein a transformed loop enables exploitation of nested loop-level parallelism.

8. A system comprising:
   a computing system including at least one processor with one or more physical cores;
   computer code including a loop, wherein the computer code is executed on the computing system; and
   a component configured to:
     optimize the computer code by relaxing the dependence between iterations of the loop based on the number of physical cores in the processor and the impact of further relaxation on the increase in the amount of computation and memory operations required to execute the further relaxed dependencies: and
   wherein relaxing the dependence between iterations includes operations to:
     build a data dependence graph of an iteration of the loop;
     compute the minimum dependence distance to determine a recurrence;
     compute a relaxation factor for the recurrence;
     update the dependence graph of the loop based on the relaxation factor;
     insert a post-wait synchronization or barrier synchronization in a transformed loop; and
     dynamically map the iterations of the transformed loop on to an idle thread.

9. A system according to claim 8 wherein at least one activity is performed dynamically.

10. A system according to claim 8 further wherein the dependence structure of at least one of the loops is transformed with recurrences for maximal degree of thread-level parallelism.

11. A system according to claim 10 wherein threads are mapped on to either different logical processors or can be mapped onto different physical cores.

12. A system according to claim 8 further wherein at least one loop is parallelized and executed by the system at least partially in parallel.

13. A system according to claim 8 further wherein a transformed loop enables exploitation of nested loop-level parallelism.

14. A non-transitory machine-accessible medium having stored thereon instructions, wherein the instructions, when accessed, result in a machine performing method of claim 1 operations comprising:
   modifying, using one or more processors, computer code by relaxing the dependence between iterations of at least one loop in the code, wherein the modification in the code is based on the number of physical or logical cores in the processor and the impact of further relaxation on the increase in the amount of computation or memory operations required to execute the further relaxed dependencies;
building a data dependence graph of an iteration of at least one of the loops;
computing the minimum dependence distance to determine a recurrence;
computing a relaxation factor for the recurrence;
updating the dependence graph of the loop based on the relaxation factor;

inserting a post-wait synchronization or barrier synchronization in a transformed loop; and
dynamically mapping the iterations of the transformed loop on to an idle thread.

15. A system according to claim 8 wherein the component is a compiler program launched from a non-transitory computer-readable medium.

* * * * *